No. 805,209. PATENTED NOV. 21, 1905.
H. KITCHIN.
UNDERGEAR FOR GO-CARTS AND THE LIKE.
APPLICATION FILED JAN. 27, 1905.
2 SHEETS—SHEET 1.
Fig-1-
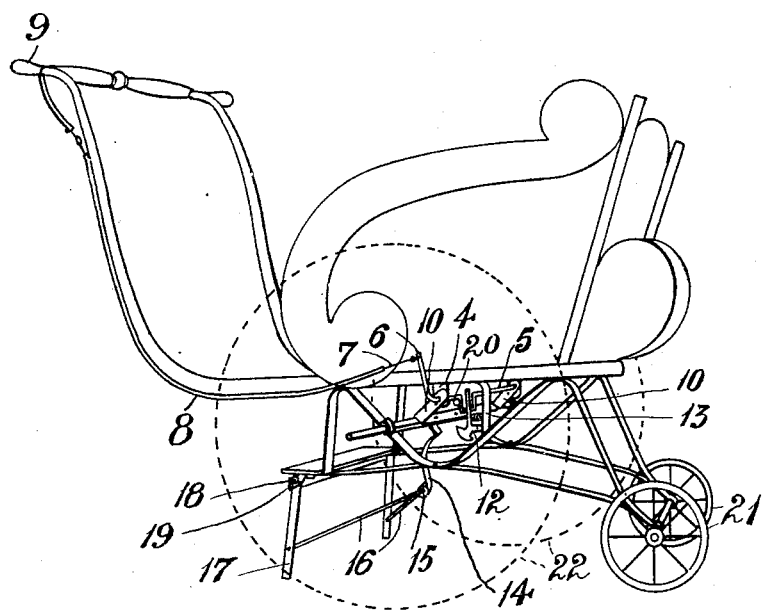
Witnesses
Walker C. Hart
William J. Harris
Inventor
Harry Kitchin
by
Edwd Waters & Son
Attorneys

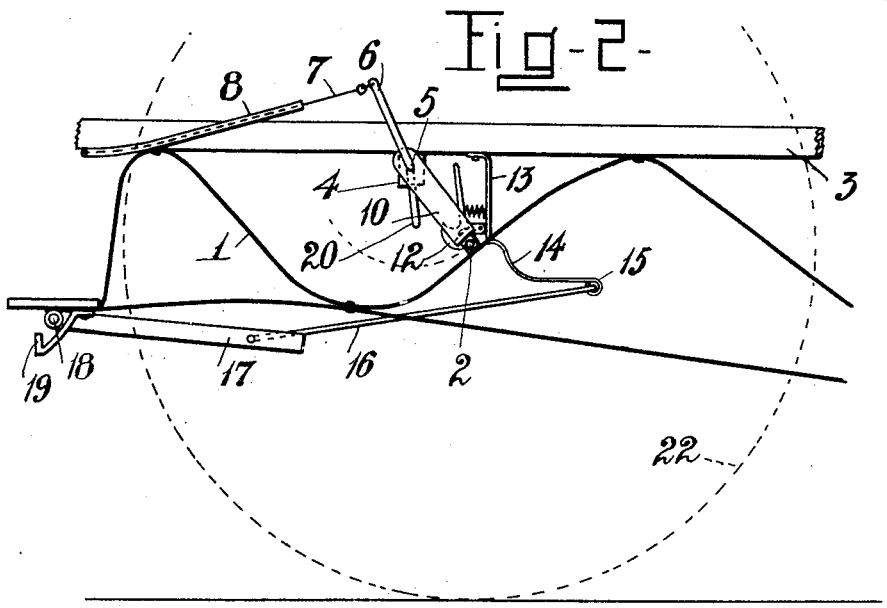
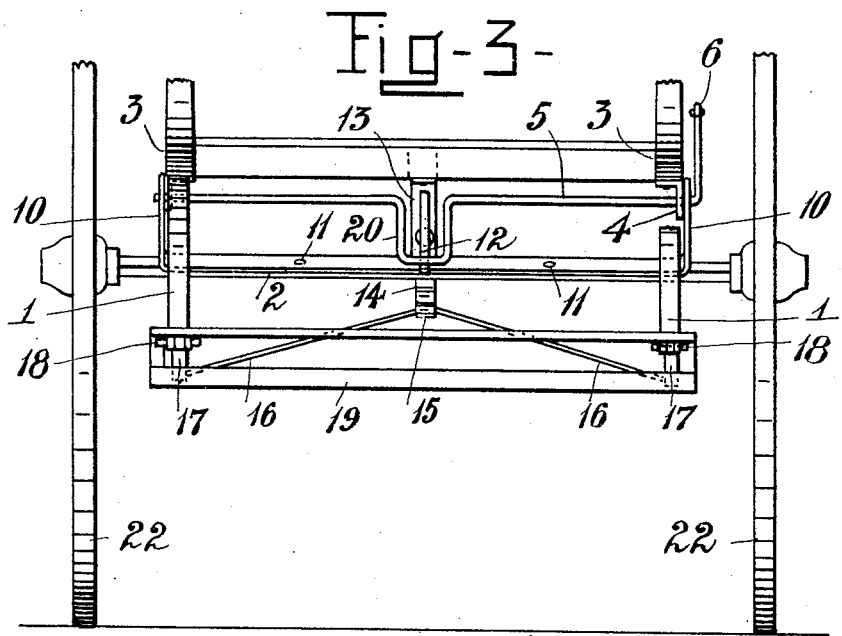

UNITED STATES PATENT OFFICE.

HARRY KITCHIN, OF MIDDLE PARK, NEAR MELBOURNE, VICTORIA, AUSTRALIA.

UNDERGEAR FOR GO-CARTS AND THE LIKE.

No. 805,209. Specification of Letters Patent. Patented Nov. 21, 1905.

Application filed January 27, 1905. Serial No. 242,933.

*To all whom it may concern:*

Be it known that I, HARRY KITCHIN, mechanical engineer, a subject of the King of Great Britain, residing at 9 Park road, Middle Park, near Melbourne, in the State of Victoria, Australia, have invented Improved Undergears for Go-Carts and the Like, of which the following is a specification.

With go-carts and the like at present in use the fixed legs on the forward part thereof, on which said cart rests when not in use, are a source of trouble and comparative danger by reason of their striking stones, gutters, and other uneven and protruding portions of the ground. Another disadvantage which accompanies these carts is that when at rest on any incline they are liable to start off of their own accord, an occurrence often fraught with considerable danger to the occupant. This action is made possible by reason of the fact that the greater part of the weight of the cart is borne by the wheels, the forward legs only lightly touching the ground, and thus occasioning very little friction.

It is with the object of overcoming these defects that I have devised this invention, which simply and efficiently removes both of same by the one operation.

In order to facilitate a clear understanding of the means by which this is accomplished, I will refer to the accompanying drawings, of which—

Figure 1 is a perspective view with parts removed of a go-cart with my improved undergear; and Fig. 2 is a side elevation with parts of the cart removed and the axle locked in its normal position, while Fig. 3 is a front elevation of same.

The cart is provided with the usual approximately V-shaped frames 1, one on each side thereof and extending along the length of the cart in such a way that the apex of said frame is situate in advance of the normal position of the axle 2. Beneath the body 3 of the cart and suitably journaled in a pair of downwardly-projecting lugs 4 is a crank-bar 5. One end of this crank-bar is bent, as at 6, and has attached to its outer end a cord 7, which extends through suitable tubing 8 or guides to the handle-bar 9. Depending from said crank-bar 5 and revolubly mounted on same are a pair of arms 10, which, if desired, may be made integral, as in Fig. 1. These arms 10 are securely attached, by means of rivets 11 or the like, to the axle-bar 2 and are of such a length that said axle-bar just clears the above-mentioned frame 1. A spring clip or catch 12 is also pivotally mounted upon a longer lug 13, fixed to the under side of the body 3, and is so arranged in order to hold the axle-bar 2 firm when in its normal position. Upon said axle-bar 2 and at its middle portion is also arranged a projecting arm 14, in which is journaled, as at 15, a rigid bent piece 16, attached at its forward ends to depending legs 17, which are hinged, as at 18, to the body of the cart and are normally held up in an approximately horizontal position, as shown in Fig. 2. A stop 19 is also provided in front of said legs to limit their outward movement. Upon said crank-bar 5 is mounted or bent a projecting part 20, which engages one end of said spring clip or catch 12.

It will thus be seen that when in the normal or traveling position the axle-bar 2 is firmly held in place between the frame 1 and the spring clip or catch 12, while at the same time the depending legs 17 are drawn up and held in an approximately horizontal position, as shown in Fig. 2, so as not to impede or otherwise obstruct the progress of the cart. When it is desired to rest, the cord 7 is pulled, partially rotating the crank-bar 5. The projecting part 20 is thus brought to bear on the spring clip or catch 12 and operates same, so as to release the axle-bar 2. The handle-bar 9 is then slightly raised and the cart is supported on the small wheels 21, when the axle-bar 2, carrying the main wheels 22, swings forwardly, at the same time depressing the legs 17. The legs 17 now being in the position shown in Fig. 1 will contact with the ground and bear the main weight of the cart, thus obviating any possibility of the cart moving on its own accord, even on a steep incline.

My gear is so arranged that the usual underframes at present in stock may be generally utilized therewith, and even on carts already manufactured it is an easy matter to further attach my improvements.

Having now particularly described and ascertained the nature of my said invention and in what manner the same is to be performed, I declare that what I claim is—

1. Improved undergear for go-carts and the like consisting of a swinging axle-bar, a spring-clip for normally retaining same in position, a pair of approximately V-shaped frames, a crank-bar operating said spring-clip, and means for operating said crank-bar substantially as herein described.

2. Improved undergear for go-carts and the like consisting of a swinging axle-bar revolubly-mounted arms on which said axle-bar is fastened, a spring-clip for normally retaining said axle-bar in position, means for operating said clip, a pair of hinged legs, a rigid bent piece attaching said legs to the axle-bar substantially as described.

3. Improved undergear for go-carts and the like consisting of a swinging axle-bar revolubly-mounted arms on which said axle-bar is fastened, a spring-clip for normally retaining said axle-bar in position, a crank-bar operating said spring-clip and on which said arms are revolubly mounted, a cord for operating said crank-bar, a projecting arm mounted on said axle, a rigid bent piece journaled therein, a pair of hinged legs to which said bent piece is attached and a stop to check the forward motion of same, substantially as herein described and illustrated.

4. In an undergear for go-carts and the like, a swinging axle-bar in combination with a spring-clip for normally retaining the axle-bar in a fixed position, means for operating the said clip for releasing the axle-bar, and means coöperative with the swinging axle-bar forming a stop to check the forward motion of the go-cart and the like.

5. In undergear for go-carts and the like, a swinging axle-bar, a spring-clip for normally retaining same in position and a pair of hinged legs attached to said axle-bar substantially as herein described.

In testimony whereof I have hereunto set my my hand in presence of two subscribing witnesses.

HARRY KITCHIN.

Witnesses:
EDWARD WATERS,
EDWARD NEEDHAM WATERS.